United States Patent Office 3,541,342
Patented Nov. 17, 1970

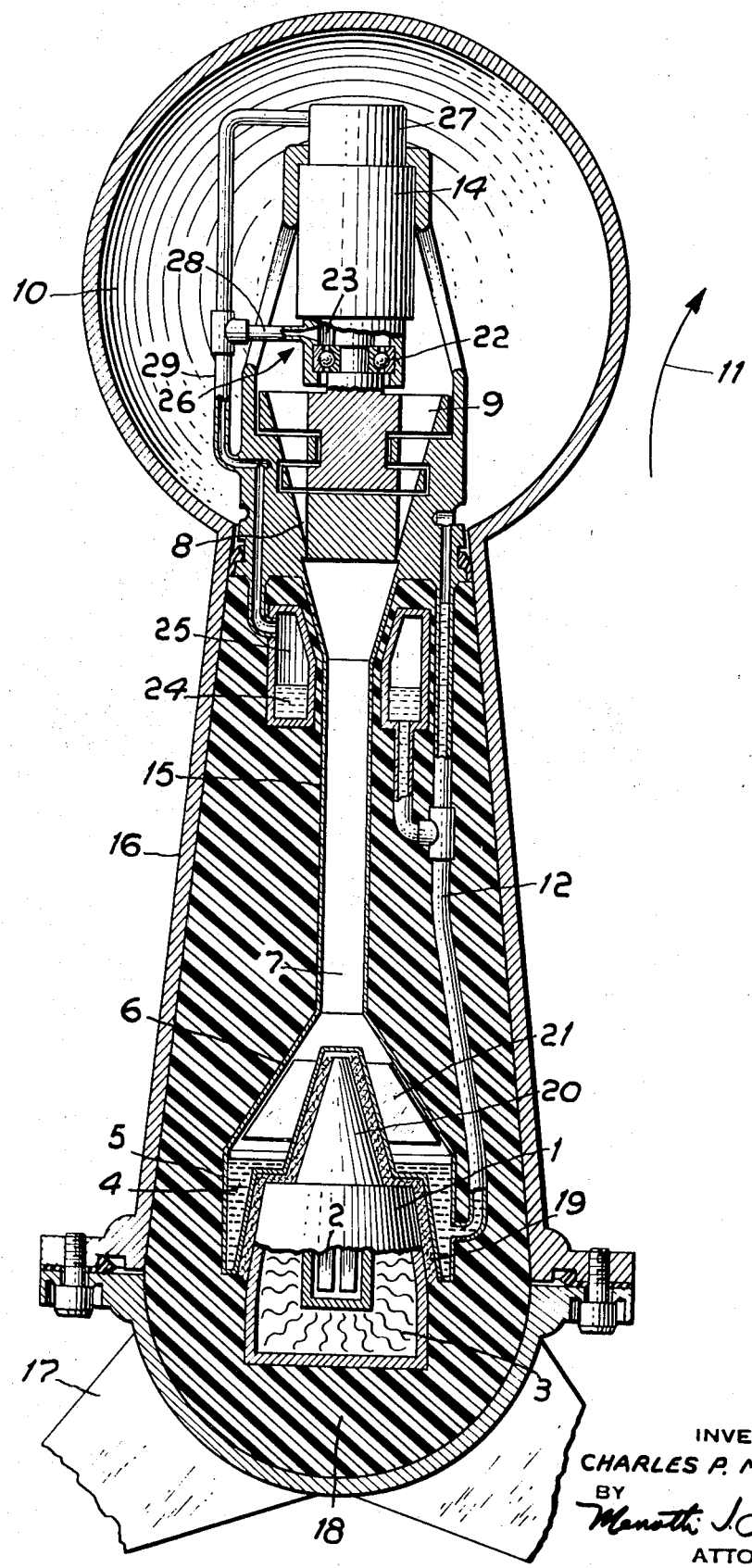

3,541,342
SUBMERGED ENERGY CONVERTER
Charles P. Majkrzak, Nutley, N.J., assignor to International Telephone and Telegraph Corporation, Nutley, N.J., a corporation of Delaware
Filed Dec. 1, 1967, Ser. No. 687,336
Int. Cl. F01d 25/20
U.S. Cl. 290—2
4 Claims

ABSTRACT OF THE DISCLOSURE

An arrangement is provided for converting the energy of radiation from a radio-isotopic energy source into useful electrical energy using a mercury-vapor turbogenerator system, and means are provided in this system to enhance the heat transfer between the heat source and the boiler and superheater sections.

CROSS REFERENCES TO RELATED APPLICATIONS

This assignee's related applications include a "Power Supply System," Ser. No. 556,990, filed June 13, 1966 (now Pat. No. 3,449,589; "An Oceanographic Data Collecting Buoy Arrangement," Ser. No. 619,978, filed Mar. 2, 1967; "Lubricating Arrangement for Mercury-Vapor Turbogenerator," filed May 8, 1967, Ser. No. 636,836 (now Pat. No. 3,447,314); and a "Hydrospace Energy Converter," Ser. No. 657,218, filed July 31, 1967.

BACKGROUND OF THE INVENTION

In general, this invention relates to remote submerged systems that are required to operate for several years without attention, and more particularly, it relates to an improved mercury-vapor turbogenerator system utilizing a radioisotopic energy source for conversion of the energy of radiation into useful electrical energy, and as such, the energy converter is independent of the atmosphere for its operation.

It has been noted that, in the electrical power output range of 500 to 1,500 watts, the most reasonable submerged long-term power system is an isotopic-dynamic power system. With this point in mind, an energy converter, wherein the radiation from a decaying isotopic source creates heat so as to operate a turbo generator, was conceived and described in co-pending application Ser. No. 657,218, indicated above.

In keeping within the requirements of a deeply submerged power source, the improvements provided and described in this application make a deeply-submerged power source of long duration practical and offer a substantially higher efficiency and lower initial cost than other submerged energy converters of a similar output.

SUMMARY OF THE INVENTION

It is therefore an object of this invention to provide an improved means for converting the energy of radiation from a radioisotopic energy source into useful electrical energy.

Another object of this invention is to provide a means to enhance the heat transfer from said radio-isotopic energy source to efficiently convert the operating fluid and to superheat its vapor.

Still another object of this invention is to utilize the superheated vapor to activate, run, operate, etc, the lubricating means incorporated in the turbogenerator.

According to the broader aspects of this invention, an isotopic power source is used to heat liquid mercury contained within a boiler wherein means are provided for enhancing the transfer of heat from the isotopic source to the boiler and superheater, the superheated mercury-vapor is then available to drive a turbogenerator and to provide heat to activate a means for adequate lubrication of the turbogenerator system, and the vapors are finally condensed and the condensates returned to their respective boiler and vessel to that the operating fluid and the lubricating fluid is contained within a closed system.

BRIEF DESCRIPTION OF THE DRAWING

The above-mentioned and other objects of this invention will become more apparent by reference to the sole figure, which shows a submerged energy converter according to the invention.

DESCRIPTIIN OF THE PREFERRED EMBODIMENT

In general, the figure illustrates a submerged energy converter wherein an isotopic heat source 1 comprises radio isotopes 2 and the surrounding biological shield 3. The radiation heats liquid mercury 4 contained in boiler section 5 to evaporate it and to further heat its vapor in superheater section 6. The superheated vapor 7 is expanded in a nozzle 8, the resulting mercury-vapor jet rotates a wheel assembly 9 whose blades travel at a linear velocity suitable in ratio to the vapor velocity. The vapor thereafter reverts to liquid form in the condenser 10 which is cooled by the free circulation of external sea water 11. The condensed mercury, due to its very high density, is returned by gravity to the mercury boiler 9 in a feed line 12. The rotating wheel assembly 9 directly drives a permanent-magnet rotor 13 which, in turn, causes the generation of electrical energy within stator 14.

Connecting the superheated mercury-vapor between the superheater section 6 and nozzle 8 is a riser 15. The entire arrangement of components are contained within a hydrostatic casing 16 which may have attached to it a mounting arrangement 17. Thermal insulation 18 insures against excessive heat loss and maintains proper operating temperatures in the areas indicated.

The heat of radiation is transferred to the liquid mercury 4 from the heat source 1 through a compressed thermal filler 19 which may be a compressed carbon or graphite felt enhances the transfer of heat between prising the wall of the isotopic heat source, the filler material, and the wall of the boiler. The heat transferred to the superheater section 6 also passes through this composite structure, however, it includes an extension of the casing of heat source 1 in the form of a thermal-conductive rod 20. The compressed thermal filler (carbon or graphite felt) is sandwiched between the conductive rod 20 and the superheater wall to cause the maximum amount of heat to be transferred from the heat source to the superheater fins 21 which superheat the rising mercury-vapor.

This configuration of the radio-isotope package with the thermal conductor provides for more efficient boiling of the mercury and superheating its vapor. Carbon or graphite felt enhances the transfer of heat between radio-isotopic heat source and the boiler and superheater assembly, since the compressed felt fills voids at the interface due to manufacturing tolerances and the variable rates in thermal expansion.

One example of felts suitable for such application are manufactured by Union Carbide Corp. and identified as "Carbon Felt Grades VDF and VDG," and "Graphite Felt Grade WDF." Normally these felts are used for thermal insulation, whereas according to the compressed manner used herein they act as an excellent means for heat transfer. For example, compressed graphite felt approaches 50 B.t.u./hr.-sq. ft. F. ° ft. at 1,000° F., and air approaches 0.03 B.t.u./hr. sq. ft. F. ° ft. at 1,000° F.

Another feature in connection with the disclosed arrangement is to include ball bearings 22 in the generator, and to have these bearing lubricated with a lubricating mist 23 obtained by charging the closed system with a quantity of compatible silicone fluid 24, as disclosed in the before mentioned application Ser. No. 636,836.

The fluid 24 becomes entrapped and remains atop the liquid mercury 4 in the return line 12 as indicated in the drawing. The exchange of some heat from the heat riser 15 containing a superheated mercury-vapor 7 passes to the vessel 25 by virtue of their adjacent positions and complementary shapes. The vessel 25 contains a localized quantity of silicone fluid which, because of the heat, increases its vapor pressure sufficiently so as to permit its expansion through nozzle 26 as a continuous mist 23 which is directed upon the bearings 22. A similar arrangement is provided at the other end 27 of the generator. Since the silicone fluid is evaporated and condensed in a closed, evacuated and circulating system, gel time in the absence of oxygen is sufficiently long to permit long life to the unit. The operating conditions within the condenser for a thermodynamic cycle being considered permits the use of a silicone fluid of which Dow-Corning FS–1265 is an example. In the proper viscosity, the volatility and vapor pressure is suitable for the desired use.

Although I have described above a feature of the invention utilizing a nozzle 26, it is also possible, and is to be considered within the scope of the invention, to omit the nozzle 26 and have connecting tube 28 arranged to permit a periodic dripping of the silicone fluid on bearings 22. In this arrangement, the silicone fluid vapor would not be allowed to expand through a nozzle, but would condense in the capillary connecting tube 28 and the silicone fluid condensate would, by the force of the silicone fluid vapor pressure in line 29, and in vessel 25, cause a lubricating fluid drip onto the bearings 22.

As indicated in the foregoing detailed description there is provided a submerged energy converter which utilizes an isotopic heat source to convert liquid mercury within a boiler into a vapor, and by means of a compressed thermal filler, together with a thermal conductor to superheat the mercury vapor and cause generation of electrical energy within a turbogenerator. The arrangement is also enhanced by the use of a lubricating system utilizing the heat from the superheated mercury vapor to cause a lubricating mist or droplets to be formed and directed upon ball bearing located in the generator. This arrangement thus meets the objects of the invention by providing an efficient long term submersible energy converter which is operationally independent of the atmosphere.

While I have described above the principles of my invention in connection with the specific apparatus, it is to be clearly understood that this description is made only by way of example and not as a limitation to the scope of my invention, as set forth in the objects thereof and in the accompanying claims.

I claim:

1. A submerged energy converter contained within a hydrostatic casing comprising:
   an isotopic heat source;
   a boiler positioned adjacent said heat source for converting liquid mercury to an operating vapor;
   means for superheating said operating vapor to produce the superheated mercury-vapor;
   means to enhance the transfer of heat from said isotopic source to said boiler and superheating means, said enhancing means including a compressed thermal filler;
   means adapted to transport said superheated vapor to an expansion nozzle including an insulated riser;
   means responsive to the expanding vapor to produce electrical energy including a rotating wheel assembly, which is adapted to drive a ball bearing mounted permanent magnet rotor which, in turn, causes the generation of said electrical energy within a stator;
   lubricating means for continuously lubricating said ball bearings with a lubricating mist, said lubricating means including a chamber located adjacent to and having a complementary shape with said riser and containing a localized quantity of silicone fluid which, due to the heat of said superheated mercury-vapor, increases in vapor pressure and is permitted to expand through a connecting nozzle to direct a continuous mist on said bearings;
   condensing means for converting said mercury-vapor and silicon mist into a condensate; and
   means for returning said mercury vapor condensate to said boiler and for returning the silicon condensate to said chamber, whereby the mercury operating fluid and the silicon fluid is contained in a closed system.

2. A converter according to claim 1, wherein said enhancing means further includes a thermal conductor attached to said heat source and projecting into the superheater section of said converter; and sandwiched between said thermal conductor and the walls of said superheater section is said compressed thermal filler.

3. A converter according to claim 2 wherein said compressed thermal filler is a compressed carbon or graphite felt.

4. A converter according to claim 3, further including in said superheater section superheating fins, whereby the heat is transferred from said isotopic source through said thermal conductor and said compressed felt to said superheater fins to superheat the rising mercury-vapor.

References Cited

UNITED STATES PATENTS

| | | | |
|---|---|---|---|
| 2,765,414 | 10/1956 | Gendler et al. | 290—2 |
| 3,061,733 | 10/1962 | Humpal | 60—36 XR |
| 3,089,840 | 5/1963 | Carter et al. | 60—36 |
| 3,099,131 | 7/1963 | Rosa | 60—203 |
| 3,172,258 | 3/1965 | Pacault | 176—65 |
| 3,244,598 | 4/1966 | Rose et al. | 176—65 XR |
| 3,435,617 | 4/1969 | Wagle | 176—65 XR |

GLEN SIMMONS, Primary Examiner

U.S. Cl. X.R.

290—52; 60—36